No. 776,224. Patented November 29, 1904.

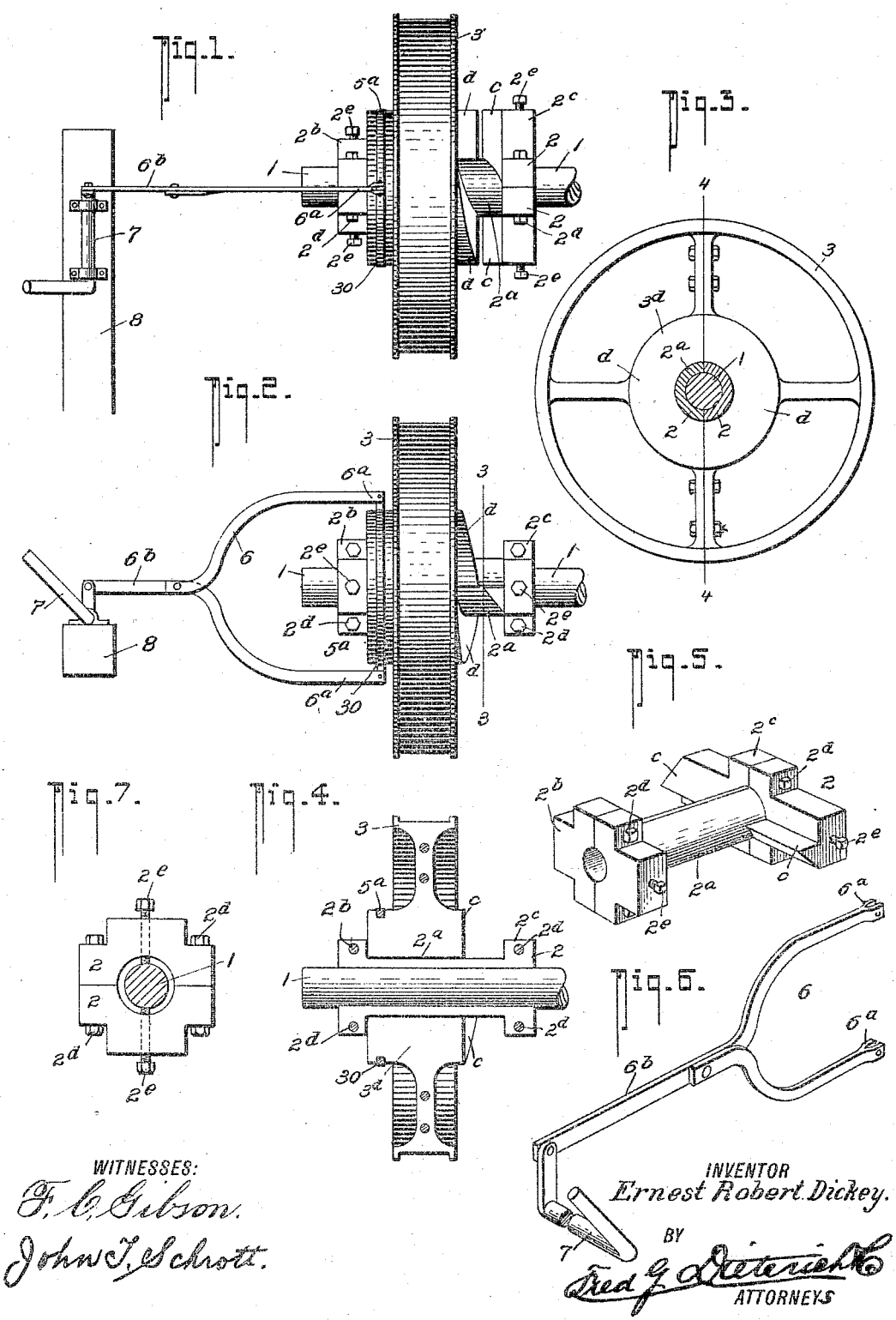

UNITED STATES PATENT OFFICE.

ERNEST ROBERT DICKEY, OF WELLSBURG, WEST VIRGINIA.

CLUTCH MECHANISM.

SPECIFICATION forming part of Letters Patent No. 776,224, dated November 29, 1904.

Application filed March 5, 1904. Serial No. 196,691. (No model.)

*To all whom it may concern:*

Be it known that I, ERNEST ROBERT DICKEY, residing at Wellsburg, in the county of Brooke and State of West Virginia, have invented a new and Improved Clutch Mechanism, of which the following is a specification.

My invention more particularly seeks to provide a simple, inexpensive, and effective means for mounting a clutching and drive pulley to a jack or other drive-shaft for oil-well-pumping and other engines, and primarily it comprehends a peculiar coöperative arrangement of split or sectional sleeve adapted to be fixedly mounted upon the engine drive-shaft and to support the loosely-mounted drive-pulley and provided with a clutch portion adapted to engage with a specially-constructed opposing clutch-face upon the drive-pulley.

In its more subordinate features my invention consists in certain details of construction and combination of parts, that will be hereinafter fully described, specifically pointed out in the appended claim, and illustrated in the accompanying drawings, in which—

Figure 1 is a top plan view of a clutch mechanism constructed in accordance with my invention. Fig. 2 is a side elevation thereof. Fig. 3 is a transverse section taken practically on the line 3 3 of Fig. 2. Fig. 4 is a longitudinal section on the line 4 4 of Fig. 3. Fig. 5 is a detail perspective view of the combined two-part sleeve and clutch member. Fig. 6 is a detail view of the clutch-shifting lever devices hereinafter referred to. Fig. 7 is a detail view showing the manner of securing the hub to a shaft of less diameter than the hub-bore.

In the drawings, 1 designates one end of a drive-shaft of a gas or other engine, which is supported in any suitable manner.

The design of my improved clutch mechanism, which I shall now describe in detail, is such that the same can be quickly attached to or disconnected from the drive-shaft 1, and the said mechanism comprises a clutch sleeve or hub formed of two half-sections 2 2 of similar shape. Each of the sections 2 embodies a semicircular pulley-bearing portion $2^a$ and cross-heads $2^b$ $2^c$, one of which, $2^c$, has an inwardly-projecting beveled clutch-lug $c$, and the two lugs $c$ on the two half sleeve-sections 2 2 are beveled in opposite directions with respect to each other, whereby to properly coact with a pair of diametrically oppositely disposed beveled clutch-flanges $d\,d$, integrally formed with the hub portion $3^d$ at one side of the drive-pulley 3.

To provide for properly fitting the sectional sleeve or hub on the shaft 1, clamp-screws $2^d$ are mounted in the outer ends of the cross-heads $2^b$ $2^c$, by means of which the two sections 2 2 can be drawn up close about the shaft as desired, and for further steadying the sleeve or boxing 2 upon the shaft 1 additional set-screws $2^e$ are provided, that can be readily arranged to bear on the shaft and to set the said shaft with respect to the sleeve should it be of a diameter less than the internal opening of the sleeve or boxing.

The pulley 3 may be of any approved type; but it is preferably a split pulley, as shown, and at one side of the hub, opposite the clutch side, the pulley has an annular groove 30 to receive the band $5^a$ of a shifting-lever device, which in my construction shown includes a U-shaped shaft member 6, the forked ends $6^a$ of which are pivotally connected to the band 5 at diametrically opposite points, and the extension $6^b$ of the member 6 is connected to a bell-crank lever 7, which is rockably mounted upon a supporting-beam 8, as shown.

From the foregoing, taken in connection with the accompanying drawings, it is believed the complete construction, the manner in which my improvement is applied for use, and its advantages will be readily understood by those skilled in the art to which it appertains.

I am aware that clutch mechanism in which are included split hub members have been heretofore provided, and I therefore do not broadly claim such feature.

My invention, so far as I know, differentiates from what has heretofore been provided in this art in the special construction of the sectional sleeves upon which the pulley is loosely mounted and which are arranged to be easily applied or disconnected from the shaft and readily clamped thereon and upon which the pulley is freely movable endwise to interlock with or run free of the clutch portions that form a fixed portion of the said sectional sleeve members.

Having thus described my invention, what I claim, and desire to obtain by Letters Patent, is—

The hereinbefore-described clutch mechanism which consists of a two-part sleeve, each part being formed with a semicircular bearing portion, a cross-head integral with the said bearing portion at each end thereof, one of the cross-heads having an inwardly-projecting beveled clutch member, each of the cross-heads having laterally-projecting ears, set-screws that engage the projecting ears of the adjacent cross-head sections for clamping the said sections securely together, the said sectional sleeve being arranged to loosely fit upon a shaft, clamping-screws mounted in the laterally-projecting ears of the adjacent cross-heads of the two sections and adapted to project into the core of the sleeve to engage the shaft and center the said sleeve, a two-part pulley adapted to fit upon the cylindrical bearing portion of the two-part sleeve and endwise movable between the cross-heads of the said sleeve, said pulley having at one side a clutch member for engaging the clutch member on the cross-head of the sleeve and having a projecting hub provided with a groove to receive a clutch-lever, all being arranged substantially as shown and described.

ERNEST ROBERT DICKEY.

Witnesses:
W. H. SCOTT,
JAMES H. SCOTT.